(12) United States Patent
Arcella et al.

(10) Patent No.: US 6,630,271 B1
(45) Date of Patent: Oct. 7, 2003

(54) ELECTROLYTE POLYMERS FOR LITHIUM RECHARGEABLE BATTERIES

(75) Inventors: Vincenzo Arcella, Milan (IT); Giulio Brinati, Milan (IT); Aldo Sanguineti, Milan (IT)

(73) Assignee: Ausimont S.p.A., Milan (IT)

( * ) Notice: Subject to any disclaimer, the term of this patent is extended or adjusted under 35 U.S.C. 154(b) by 0 days.

(21) Appl. No.: 09/496,186

(22) Filed: Feb. 2, 2000

(30) Foreign Application Priority Data

Feb. 5, 1999 (IT) .......................... MI99A0222

(51) Int. Cl.$^7$ .................... H01M 6/18; H01M 4/60; H01M 2/16; C08F 114/18; C08F 214/18
(52) U.S. Cl. .................... 429/316; 429/323; 429/212; 429/249; 526/242; 526/255
(58) Field of Search ................ 429/212, 217, 429/249, 306, 309, 323, 326; 526/242, 250, 255

(56) References Cited

U.S. PATENT DOCUMENTS

| | | | | |
|---|---|---|---|---|
| 3,136,745 A | * | 6/1964 | Albin et al. | 526/229 |
| 3,235,537 A | * | 2/1966 | Albin et al. | 422/181 |
| 5,296,318 A | | 3/1994 | Gordz et al. | 429/192 |
| 5,418,091 A | | 5/1995 | Gordz et al. | 429/252 |
| 5,456,000 A | | 10/1995 | Gordz et al. | 29/623.2 |
| 5,707,763 A | * | 1/1998 | Shimizu et al. | 429/217 |
| 6,077,624 A | * | 6/2000 | Mitchell et al. | 429/217 |

FOREIGN PATENT DOCUMENTS

| | | |
|---|---|---|
| EP | 0 626 396 B1 | 11/1994 |
| EP | 0 655 468 B1 | 5/1995 |
| EP | 0 816 397 A1 | 1/1998 |
| JP | 10-294131 * | 11/1998 .......... H01M/10/40 |

OTHER PUBLICATIONS

J. M. Tarascon, Solid State Ionics 86–88 (1996), pp. 49–54 Performance of Bellcore's Plastic Rechargeable Li–ion Batteries.

* cited by examiner

*Primary Examiner*—Patrick Ryan
*Assistant Examiner*—Julian Mercado
(74) *Attorney, Agent, or Firm*—Arent Fox Kintner Plotkin & Kahn PLLC

(57) ABSTRACT

Use of vinylidenfluoride (VDF) copolymers for preparing electrolyte polymers, wherein the VDF copolymers have the following polymeric structure (I):

$$(CH_2-CF_2)_m-(CXY-C(OR_f)Z)_n-(CF_2-CF(CF_3))_p$$

wherein:

$R_f$ is a perfluoroalkyl group having from 1 to 3 carbon atoms;

X, Y, and Z equal to or different from each other are selected from F, Cl or H; m,n and p are integers, n or p can be 0 but not simultaneously;

said VDF copolymers being obtainable by emulsion polymerization at 75–120° C., preferably 95°–120° C., in the presence of organic initiators.

7 Claims, No Drawings

ELECTROLYTE POLYMERS FOR LITHIUM RECHARGEABLE BATTERIES

The present invention relates to the use of electrolyte polymers having improved conductivity in electrochemical cells incorporating said electrolyte polymer.

In particular, the invention relates to electrolyte polymers combining high mechanical properties with improved conductivity at room temperature and higher; said improved conductivity remains at high values even after thermal ageing cycles up to 80° C.

More specifically, the electrolyte polymers of the invention are used for the preparation of membranes and electrodes in lithium rechargeable batteries.

The use, in the form of film compositions, of electrolyte polymers to form the separatory membrane of a rechargeable battery cell is known in the art. A separatory membrane constituted by said electrolyte polymers, comprises a polymeric matrix which is ionically conductive due to the incorporation therein of an organic solution of a disassociable lithium salt which supplies the ionic mobility.

A polymeric matrix suitable for the use in a cell of a rechargeable battery should have the properties to be commercially available at low cost, to be electrochemically usable within a large potential range, to have an high melting temperature and low creep, to have good mechanical properties and to be able to absorb an high amount of liquid electrolyte in order to guarantee an high ionic conductivity and at the same time to remain easily processable.

In this field polyethylenoxide-based (PEO) electrolyte polymers wherein the crystalline polymer is swollen with the electrolytic solution, have been developed. The films obtained by said electrolyte polymer have good conductivity but unsuitable mechanical properties and poor electrochemical stability.

An alternative type of electrolyte polymer has been proposed in U.S. Pat. No. 5,296,318, wherein for the preparation of polymeric membranes of lithium rechargeable batteries vinylidenfluoride (VDF)-based copolymers are used. In particular in the above patent, copolymers containing VDF in amounts in the range 75%–92% by weight and hexafluoropropene (HFP) in amounts in the range 8%–25% by weight are described. These copolymers allow the preparation of polymeric electrolytes constituted by the copolymer itself and by a solvent, for example an ethylencarbonate/propylencarbonate (EC/PC) mixture, containing a lithium salt. The polymeric membrane of this composition can be obtained by casting, by dissolving the swollen polymer with an ethylencarbonate and propylencarbonate mixture wherein the lithium salt is dissolved in a solvent, for example tetrahydrofurane (THF). Subsequently the solution coating takes place on a substratum and the solvent (THF) is evaporated. In this way a polymeric film of about 100 micron is obtained. The disadvantage of these copolymers resides in that they show a low conductivity.

In the U.S. Pat. No. 5,418,091 and U.S. Pat. No. 5,456,000 a method for preparing polymeric membranes always containing a VDF/HFP copolymer and a method for preparing the battery itself, is described. In particular the polymeric membranes are prepared by an extraction/activation process whereby a suitable plasticizer is added to the polymer in an amount 20%–70% by weight. In this step the electrolyte polymer is in an unactivated form and the storage of the battery components using the electrolyte polymer itself is possible. In the unactivated form it contains said plasticizer, for example dibutylphthalate, and the activation occurs with the plasticizer extraction from the polymer and its substitution with the electrolyte solution formed by the EC/PC mixture containing the lithium salt.

The optimal amount of HFP used in the above mentioned patents for the polymerization with VDF ranges from 8% to 25% by weight in order to obtain electrolyte polymer compositions having suitable mechanical properties. When the HFP comonomer amount is lower than 8% by weight, the obtained film causes a limited retention of the high boiling solvent containing the lithium salt and therefore a reduced ionic conductivity. On the other hand, when the HFP comonomer amount is higher than 25% by weight, the obtained electrolyte polymer does not produce the formation of a film having a suitable mechanical strenght if it is not subjected to a subsequent crosslinking process by radiation.

In the mentioned patents the whole battery assembling by applying the extraction/activation process also in the anode and cathode preparation, is also described. The two electrodes are obtained by depositing, for example by casting, the polymer containing the plasticizer on the metal substrata. The separator is then placed between the two electrodes and subsequently the polymeric films present on all the battery components are subjected to a melting process, such as for example coextrusion, which favours the adhesion between the separator and the electrodes. The battery is then activated by replacing the plasticizer with the electrolyte solution containing the lithium salt. An example of preparation of these batteries according to the mentioned patents is described by J. M. Tarascon et al. in Solid State Ionic 86–88 (1996) pages 49–54.

The electrolyte polymer is therefore a system comprising the polymer itself, solvents and/or plasticizers, such as ethylencarbonate, propylencarbonate, etc. and by lithium salts, such as $LiSO_3CF_3$, $LiN(SO_2CF_3)_2$, $LiPF_6$, etc.

The drawback of the VDF/HFP electrolyte polymers of the prior art is that, even though they show good mechanical properties, they have not an high ionic conductivity. Another drawback is that the conductivity quickly decreases when the electrolyte polymer is subjected to ageing cycles at high temperatures, for example 80° C.

The need was felt to have available electrolyte polymers having an improved ionic conductivity combined with good mechanical properties; preferably characterized by improved conductivity values even after thermal ageing cycles at high temperatures, up to 80° C.

The Applicant has surprisingly found electrolyte polymers based on VDF copolymers, showing an improved conductivity, preferably maintaining said improved conductivity values even after thermal ageing cycles at high temperatures.

An object of the present invention is therefore the use of vinylidenfluoride (VDF) copolymers for preparing electrolyte polymers, wherein the VDF copolymers have the following polymeric structure (I):

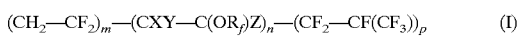
$$(CH_2-CF_2)_m-(CXY-C(OR_f)Z)_n-(CF_2-CF(CF_3))_p \qquad (I)$$

wherein:
$R_f$ is a perfluoroalkyl group having a number of carbon atoms from 1 to 3; X, Y, and Z equal to or different from each other are selected from F, Cl or H, preferably F;
m,n and p are integers defining the number of corresponding monomeric units present in the polymer, n or p can be 0 but not simultaneously; the sum of the repeating units m,n,p is such as to give a copolymer having a melt flow index (MFI), measured at 230° C. according to the ASTM D-1238 method under a 10 kg load, in the range 0.1–100, preferably 0.5–50;

said VDF copolymers being obtainable by emulsion polymerization at 75–120° C., preferably 95°–120° C., in the presence of organic initiators.

The VDF amount in the polymeric structure (I) expressed by moles and identifiable by $NMR^{19P}$ is in the range 92%–99% by moles and the comonomers amount is in the range 1–8% by moles, preferably the comonomers amount is in the range 2–5% by moles.

In the present invention the VDF comonomers can be selected from hexafluoropropene (HFP) and/or perfluoroalkylvinylethers of formula (II):

$$CXY=CZOR_f \qquad (II)$$

wherein: X, Y, Z, $R_f$ have the above defined meaning.

The preferred comonomers are perfluoroalkylvinylethers of formula (II) wherein X, Y and Z are fluorine atoms and specifically: perfluoromethylvinylether (MVE) wherein $R_f$=$CF_3$, perfluoroethylvinylether (EVE) wherein $R_f$=$CF_2CF_3$, perfluoropropylvinylether (PVE) wherein $R_f$=$CF_2CF_2CF_3$. Also a mixture of the mentioned comonomers can be used.

The Applicant has surprisingly and unexpectedly found that the use of the above preferred comonomers and of the above indicated polymerization conditions allows to obtain electrolyte polymers having an improved conductivity, higher than about $10^{-3}$ S/cm, while maintaining said improved conductivity values even after thermal ageing cycles at high temperatures.

The films obtainable by the use of the electrolyte polymers of the present invention have an improved ionic conductivity combined with high mechanical properties and they do not necessarily require cross-linking as essential step to obtain the invention results.

The VDF copolymers of the invention are suitable for preparing electrolyte polymers usable in the manufacture of the lithium rechargeable battery main elements, such as the separatory polymeric membrane, the anode and the cathode.

It has been found by the Applicant that comonomer amounts lower than 1% by moles give electrolyte polymers having too low ionic conductivities and therefore unsuitable to the preparation of the various components of the lithium batteries. The ionic conductivities of the electrolite polymers of the inventions are preferably higher than about $10^{-3}$ $Scm^{-1}$ measured at room temperature on polymeric films having a 100 µm thickness. Said films are prepared via casting and constituted for 30% by weight by the copolymeric matrix and for 70% by weight by a 1.5 M (molar) of $LiN(SO_2CF_3)_2$ solution dissolved in ethylencarbonate/propylencarbonate in a 1:1 ratio by volume. Comonomer amounts higher than 8% by moles give copolymer melting temperatures lower than 130° C. (reduced crystallinity) and therefore unsuitable mechanical properties of the polymeric films forming the separatory membrane, the anode and the cathode.

As said, the VDF copolymers of the invention are prepared by emulsion polymerization at a synthesis temperature in the range 75–120° C., preferably 95–120° C. As polymerization initiators, the organic ones are used, such as diterbutylperoxide (DTBP) or the diisopropylperoxydicarbonate (IPP). Other organic initiators are those used in the VDF emulsion polymerization. The emulsion polymerization of the monomers of the invention is described for example in EP 626,396. The polymer synthesis can furthermore take place, preferably, in microemulsion as described in the European patent application EP 816,397 in the name of the Applicant.

In case of the (co)polymerization in aqueous emulsion, the presence of a suitable surfactant is required. The most commonly used are fluorinated surfactants of formula:

$$R_f\text{-}X^-\text{-}M^-$$

wherein $R_f$ is a (per)fluoroalkylic chain $C_5$–$C_{16}$ or a (per)fluoropolyoxyalkylenic chain, $X^-$ is —COO$^-$ or —$SO_3^-$, $M^-$ is selected from: $H^-$, $NH_4^-$, an alkaline metal ion. Among them, ammonium and/or sodium perfluoro-octanoate; (per)fluoropolyoxyyalkylene terminated with one or more carboxylic groups, etc. can be mentioned.

The polymerization can be advantageously carried out in the presence of perfluoropolyoxyalkylenes emulsion or microemulsions, according to U.S. Pat. Nos. 4,789,717 and 4,864,006, or also of fluoropolyoxyalkylenes microemulsions having hydrogenated end groups and/or hydrogenated repeating units, according to EP patent application 625,526.

In the polymer synthesis suitable chain transfer agents for the molecular weight regulation, such as for example HCFC 123 as described in EP 655,468, can be used.

The polymer latex obtained by polymerization is coagulated and washed with demineralized water, preferably the washing is repeated more than 5 times, e.g. 10 times, and dried at a temperature in the range of 80–120° C. for a time comprised between 12–24 hours.

The molecular weight of the obtained copolymer can be expressed by the melt flow index (MFI) measured at 230° C. according to the ASTM D-1238 method. The copolymer MFI is in the range 0.1–100 under a 10 Kg load as above said.

The electrolyte polymer comprises the VDF copolymers of the invention and a solvent containing a dissolved lithium salt, optionally a plasticizer. Consequently the electrolyte polymer electrical properties depend also on the choice and the amount of the lithium salt and of the solvent containing its ions. As lithium salts, $LiSO_3CF_3$, $LiN(SO_2CF_3)_2$, $LiPF_6$, $LiClO_4$, $LiAsF_4$, $LiBF_4$ can more suitably be used. The compatible solvents and plasticizers can be ethylencarbonate, propylencarbonate, dimethylcarbonate, diethoxyethane, diethylcarbonate, dimethoxyethane, dimethylphthalate, dibutylphthalate, tetraethylene glycol dimethylether, N-methyl-pyrrolidone. The usable solvent amount is generally in the range 20%–80% by weight of the total electrolyte polymer.

The electrolyte polymer of the invention can be used in the anode and cathode manufacture, which besides incorporating suitable materials, such as for example nickel lithium oxides in the cathode and graphite in the anode, can also comprise said electrolyte polymer, thus forming composite electrodes.

The lithium battery assembly and the preparation of the polymeric separatory membranes, of the anode and the cathode starting from the present invention polymeric structure (I) can be carried out with the conventional methods known in the prior art for example by casting by using a low-boiling solvent as described in the U.S. Pat. No. 5,296,318 and EP 793,287, or by the extraction/activation method and the coextrusion process as described in the U.S. Pat. Nos. 5,148,091 and 5,456,000.

The lithium battery assembling must be carried out in an environment completely free from moisture, due to the high sensitivity of the lithium salts towards the humidity. This causes an increase of the assembly costs and it is possible to overcome this drawback by using the previously described extraction/activation methods: in this case, except for the activation step, this battery can be manufactured in an uncontrolled environment.

By using the extraction/activation process, it is important to select a low volatility plasticizer which can easily be removed from the polymeric matrix, leaving therein some pores which then swell with the electrolyte solution during the cell activation. In order to increase the electrolyte solution absorption, from the polymeric matrix, and therefore its ionic conductivity, inorganic fillers, such as for example, $SiO_2$, can be added to the polymeric matrix.

Manufactured articles obtainable from the electrolyte polymers of the invention are, as above said, films or main elements of lithium rechargeable batteries, as separatory elements, anode and cathode. These articles are obtainable by casting by using a low-boiling solvent or by the extraction/activation process as previously described. As casting low-boiling solvents, tetrahydrofurane, acetone, dimethylacetamide (DMA) can be used.

The present invention will be better illustrated by the following embodiment examples, which have a merely indicative purpose but not limitative of the scope of the invention itself.

EXAMPLES

Characterization

Preparation of the microemulsion for the synthesis reaction of copolymers of Examples 1–9

In a glass reactor equipped with stirrer, under mild stirring, 4.83 g of NaOH are dissolved in 32.83 g of demimeralized water. The obtained solution is additioned with:

1) 52.35 g of acid having an average molecular weight by number 434 of formula:

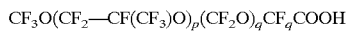

2) 10 g of Galden® of formula:

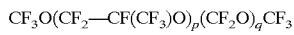

wherein p/q=20, having average molecular weight 760.

The obtaind system appears perfectly limpid between 2° C. and 90° C.

Device for the ionic conductivity measurement of polymeric films of Examples 1–9

The ionic conductivity is measured by IS (Impendance Spectroscopy) with a Solartron 1255 Frequency Response Analyzer (FRA) in the temperature range 20°–80° C. with 1 Hz–1 MHz frequency. The samples of the disk-shaped polymeric films are placed between two silver plates and the measure is carried out in static helium atmosphere in a Buchi TO-50 stove.

Example 1

The comonomer used in this Example is perfluoromethylvinylether (MVE) of formula:

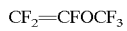

In a 21 l horizontal polymerization reactor equipped with stirrer working at 40 rpm 16 l of demineralized water and 73.4 g of microemulsion were introduced. The reactor is heated up to 125° C. and then pressurized to the pressure of relative 49 bar by a monomeric mixture having the following composition by moles:
VDF: 94%
MVE: 6%

After the feeding of 55 g of diterbutylperoxide the polymerization reaction starts and the reaction pressure is kept constant by continuously feeding the monomers in the same molar ratios of the initially fed mixture (VDF=94%; MVE=6%).

When 28 g of monomer have reacted, 5.8 g of HCFC 123 are fed as chain transfer agent. When 56 g of monomer have reacted, the synthesis temperature is increased up to 105° C. and the reaction continues at this temperature. When a prefixed amount of monomer corresponding to 4,800 g has reacted in a time of 285 minutes, the feeding of monomers is stopped. The residual monomers which cause the 49 relative bar pressure are let absorb till to the pressure of relative 9 bar.

The reactor is then degassed and the latex obtained from the synthesis is discharged. The latex is coagulated by mechanical stirring and the obtained slurry is washed for 10 times and dried at 80° C. for 24 hours; a final powder having MFI (230° C., 10 Kg of load) equal to 1 is obtained.

The copolymer composition determined by $^{19}F$-NMR is equal to 4.8% by moles of MVE, wherein the complement to 100 is given by VDF.

The copolymer temperature and the second melting enthalpy ($T_{2°}$ and $\Delta H_{2°}$) measured by DSC are respectively 134° C. and 8.4 cal/g and are shown in Table 1.

Preparation of the polymeric film starting from the copolymer

Afterwards the polymeric film preparation is carried out by using a classic casting procedure from solvent; the film preparation is effected in dry box (about 10 ppm of water).

A 0.8 g amount of the obtained VDF copolymer in powder is dissolved in 6 ml of anhydrous tetrahydrofurane (THF) and then the solution is heated up to 50° C. After complete dissolution, 1.867 g of a $LiN(CF_3SO_2)_2$ 1.5 (molar) solution dissolved in ethylencarbonate/propylencarbonate is slowly added (about 1 hour) under stirring in a 1:1 ratio by volume.

The obtained high viscosity solution is deposited on a Teflon substratum and the solvent (THF) is let slowly evaporate. A polymeric film containing 30% by weight of copolymer having a thickness of about 100 $\mu$m is thus obtained.

The polymeric film is subjected to a thermal cycle between 20° and 80° C. in the Solartron 1255 Frequency Response Analyzer (FRA), according to the cycle effected by this equipment. The ionic conductivities of the polymeric film measured at 20° $C._{(o20° C.)}$ and at 40° $C._{(o40° C.)}$ are shown in Table 1.

After the thermal cycle the polymeric film is subjected to a second ionic conductivity measurement at 20° C. The obtained data are shown in Table 2.

Example 2

The polymerization is carried out as in Example 1 except for the following changes:
a) the reactor is heated up to 125° C. and then pressurized to the pressure of relative 49 bar by a monomeric mixture having the following composition by moles:
VDF: 95.5%
MVE: 4.56%
b) after the feeding of 55 g of diterbutylperoxide the polymerization reaction starts, the reaction pressure is kept constant by continuously feeding the monomers in the same molar ratios of the initially fed mixture (VDF=95.5%; MVE=4.5%).
c) When 28 g of monomer have reacted, 25.9 g of HCFC 123 are fed as chain transfer agent.

d) When a prefixed amount of monomer corresponding to 4,800 g has reacted in a time of 300 minutes, the feeding of monomers is stopped.

On the final powder the same characterizations of Example 1 are carried out. The MFI value (230° C., 10 Kg load) is equal to 3.5.

The copolymer composition determined by $^{19}$F-NMR is equal to 3.7% by moles of MVE, wherein the complement to 100 is given by VDF.

The copolymer temperature and the second melting enthalpy ($T_{2°}$ and $\Delta H_{2°}$) measured by DSC are respectively 140° C. and 9.1 cal/g and are shown in Table 1.

Afterwards the polymeric film preparation is carried out starting from the copolymer as described in Example 1.

The polymeric film is subjected to a thermal cycle between 20° and 80° C. in the Solartron 1255 Frequency Response Analyzer (FRA). The ionic conductivities of the polymeric film measured at 20° C.$_{(o20° C.)}$ and at 40° C.$_{(o40° C.)}$ are shown in Table 1.

After the thermal cycle the polymeric film is subjected to a second ionic conductivity measurement at 20° C. The obtained data are shown in Table 2.

Example 3

The polymerization is carried out as in Example 1 except for the following changes:

a) the reactor is heated up to 125° C. and then pressurized to the pressure of relative 49 bar by a monomeric mixture having the following composition by moles:
   VDF: 97.5%
   MVE: 2.5% b) after the feeding of 55 g of diterbutylperoxide the polymerization reaction starts, the reaction pressure is kept constant by continuously feeding the monomers in the same molar ratios of the initially fed mixture (VDF=97.5%; MVE=2.5%).

c) When 28 g of monomer have reacted, 41.7 g of HCFC 123 are fed as chain transfer agent.

d) When a prefixed amount of monomer corresponding to 4,800 g has reacted in a time of 372 minutes, the feeding of monomers is stopped.

On the final powder the same characterizations of Example 1 are carried out. The MFI value (230° C., 10 Kg load) is equal to 5.5.

The copolymer composition determined by $^{19}$F-NMR is equal to 1.9% by moles of MVE, wherein the complement to 100 is given by VDF.

The copolymer temperature and the second melting enthalpy ($T_{2°}$ and $\Delta H_{2°}$) measured by DSC are respectively 153° C. and 10.7 cal/g and are shown in Table 1.

Afterwards the polymeric film preparation is carried out starting from the copolymer as described in Example 1.

The polymeric film is subjected to a thermal cycle between 20° and 80° C. in the Solartron 1255 Frequency Response Analyzer (FRA). The ionic conductivities of the polymeric film measured at 20° C.$_{(o20° C.)}$ and at 40° C.$_{(o40° C.)}$ are shown in Table 1.

After the thermal cycle the polymeric film is subjected to a second ionic conductivity measurement at 20° C. The obtained data are shown in Table 2.

Example 4

The comonomer used in this Example is hexafluoropropene (HFP) of formula:

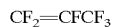

In a 21 l horizontal polymerization reactor equipped with stirrer working at 40 rpm 16 l of demineralized water and 73.4 g of microemulsion were introduced. The reactor is heated up to 125° C. and then pressurized to the pressure of relative 49 bar by a monomeric mixture having the following composition by moles:
   VDF: 94%
   HFP: 6%

After the feeding of 55 g of diterbutylperoxide the polymerization reaction starts and the reaction pressure is kept constant by continuously feeding the monomers in the same molar ratios of the initially fed mixture (VDF=94%; HFP=6%).

When 28 g of monomer have reacted, 23 g of HCFC 123 are fed as chain transfer agent. When 56 g of monomer have reacted, the synthesis temperature is increased up to 105° C. and the reaction continues at this temperature. When a prefixed amount of monomer corresponding to 4,800 g has reacted in a time of 405 minutes, the feeding of monomers is stopped. The residual monomers which cause the 49 relative bar pressure are let absorb till to the pressure of relative 9 bar.

The reactor is then degassed and the latex obtained from the synthesis is discharged. The latex is coagulated by mechanical stirring and the obtained slurry is washed for 10 times and dried at 80° C. for 24 hours. A final powder having MFI (230° C., 10 Kg of load) equal to 8.0 is obtained.

The copolymer composition determined by $^{19}$F-NMR is equal to 4.9% by moles of HFP, wherein the complement to 100 is given by VDF.

The copolymer temperature and the second melting enthalpy ($T_{2°}$ and $\Delta H_{2°}$) measured by DSC are respectively 139° C. and 8.5 cal/g and are shown in Table 1.

Afterwards the polymeric film preparation is carried out starting from the copolymer as described in Example 1.

The polymeric film is then subjected to a thermal cycle between 20° and 80° C. in the Solartron 1255 Frequency Response Analyzer (FRA). The ionic conductivities of the polymeric film measured at 20° C.$_{(o20° C.)}$ and at 40° C.$_{(o40° C.)}$ are shown in Table 1.

After the thermal cycle the polymeric film is subjected to a second ionic conductivity measurement at 20° C. The obtained data are shown in Table 2.

Example 5

The polymerization is carried out as in Example 1 except that for the following changes:

a) The reactor is heated up to 125° C. and then pressurized to the pressure of relative 49 bar by a monomeric mixture having the following composition by moles:
   VDF: 97.5%
   HFP: 2.5% b) After the feeding of 55 g of diterbutylperoxide the polymerization reaction starts, the reaction pressure is kept constant by continuously feeding the monomers in the same molar ratios of the initially fed mixture (VDF=97.5%; HFP=2.5%).

c) When 28 g of monomer have reacted, 41.7 g of HCFC 123 are fed as chain transfer agent.

d) When a prefixed amount of monomer corresponding to 4,800 g has reacted in a time of 423 minutes, the feeding of monomers is stopped.

On the final powder the same characterizations of Example 1 are carried out. The MFI value (230° C., 10 Kg load) is equal to 6.7.

The copolymer composition determined by $^{19}$F-NMR is equal to 2.0% by moles of HFP, wherein the complement to 100 is given by VDF.

The copolymer temperature and the second melting enthalpy ($T_{2°}$ and $\Delta H_{2°}$) measured by DSC are respectively 153° C. and 11.0 cal/g and are shown in Table 1.

The polymeric film preparation is carried out as described in Example 1. The ionic conductivities of the polymeric film measured at 20° $C_{\cdot(o20° C.)}$ and at 40° $C_{\cdot(o40° C.)}$ are shown in Table 1.

Example 6

The comonomer used in this Example is perfluoroethylvinylether (EVE) of formula:

$$CF_2=CFOCF_2CF_3$$

In a 21 l horizontal polymerization reactor equipped with stirrer running at 40 rpm 16 l of demineralized water and 73.4 g of microemulsion were introduced. The reactor is heated up to 125° C. and then pressurized to the pressure of relative 49 bar by a monomeric mixture having the following composition by moles:

VDF: 96%

EVE: 4%

After the feeding of 55 g of diterbutylperoxide the polymerization reaction starts and the reaction pressure is kept constant by continuously feeding the monomers in the same molar ratios of the initially fed mixture (VDF=96%; EVE=4%).

When 28 g of monomer have reacted, 40.3 g of HCFC 123 are fed as chain transfer agent. When 56 g of monomer have reacted, the synthesis temperature is increased up to 105° C. and the reaction continues at this temperature. When a prefixed amount of monomer corresponding to 4,800 g has reacted in a time of 361 minutes, the feeding of monomers is stopped. The residual monomers which cause the 49 relative bar pressure are let absorb till to the pressure of relative 9 bar.

The reactor is then degassed and the obtained latex from the synthesis is discharged. The latex is coagulated by mechanical stirring and the obtained slurry is washed for 10 times and dried at 80° C. for 24 hours; a final powder having MFI (230° C., 10 Kg of load) equal to 14 is obtained.

The copolymer composition determined by $^{19}$F-NMR is equal to 2.9% by moles of EVE, where the complement to 100 is given by VDF.

The copolymer temperature and the second melting enthalpy ($T_{2°}$ and $\Delta H_{2°}$) measured by DSC are respectively 149° C. and 9.0 cal/g and are shown in Table 1.

Afterwards the polymeric film preparation is carried out as described in Example 1.

The ionic conductivities of the polymeric film are measured at 20° $C_{\cdot(o20° C.)}$ and at 40° $C_{\cdot(o40° C.)}$. The obtained data are shown in Table 1.

Example 7

The polymerization is carried out as in Example 1 except taht for the following changes:

a) The reactor is heated up to 125° C. and then pressurized to the pressure of relative 49 bar by a monomeric mixture having the following composition by moles:

VDF: 97.5%

EVE: 2.5% b) After the feeding of 55 g of diterbutylperoxide the polymerization reaction starts, the reaction pressure is kept constant by continuously feeding the monomers in the same molar ratios of the initially fed mixture (VDF=97.5%; EVE=2.5%).

c) When 28 g of monomer have reacted, 10.3 g of HCFC 123 are fed as chain transfer agent.

d) When a prefixed amount of monomer corresponding to 4,800 g has reacted in a time of 355 minutes, the feeding of monomers is stopped.

On the final powder the same characterizations of Example 6 are carried out. The MFI value (230° C., 10 Kg load) is equal to 7.9.

The copolymer composition determined by $^{19}$F-NMR is equal to 1.8% by moles of EVE, wherein the complement to 100 is given by VDF.

The copolymer temperature and the second melting enthalpy ($T_{2°}$ and $\Delta H_{2°}$) measured by DSC are respectively 155° C. and 10.6 cal/g and are shown in Table 1.

The polymeric film preparation is carried out as described in Example 1. The ionic conductivities of the polymeric film measured at 20° $C_{\cdot(o20° C.)}$ and at 40° $C_{\cdot(o40° C.)}$ are shown in Table 1.

Example 8

The comonomer used in this Example is perfluoropropylvinylether (PVE) of formula:

$$CF_2=CFOCF_2CF_3$$

In a 21 l horizontal polymerization reactor equipped with stirrer working at 40 rpm 16 l of demineralized water and 73.4 g of microemulsion were introduced. The reactor is heated up to 125° C. and then pressurized to the pressure of relative 49 bar by a monomeric mixture having the following composition by moles:

VDF: 95.5%

PVE: 4.5%

After the feeding of 55 g of diterbutylperoxide the polymerization reaction starts and the reaction pressure is kept constant by continuously feeding the monomers in the same molar ratios of the initially fed mixture (VDF=95.5%; PVE=4.5%).

When 28 g of monomer have reacted, 26 g of HCFC 123 are fed as chain transfer agent. When 56 g of monomer have reacted, the synthesis temperature is increased up to 105° C. and the reaction continues at this temperature. When a prefixed amount of monomer corresponding to 4,800 g has reacted in a time of 240 minutes, the feeding of monomers is stopped. The residual monomers which cause the 49 relative bar pressure are let absorb till to the pressure of relative 9 bar.

The reactor is then degassed and the latex obtained from the synthesis is discharged. The latex is coagulated by mechanical stirring and the obtained slurry is washed for times and dried at 80° C. for 24 hours; a final powder having MFI (230° C., 10 Kg load) equal to 4.5 is obtained.

The copolymer composition determined by $^{19}$F-NMR is equal to 3.7% by moles of PVE, where the complement to 100 is given by VDF.

The copolymer temperature and the second melting enthalpy ($T_{2°}$ and $\Delta H_{2°}$) measured by DSC are respectively 142.3° C. and 8.4 cal/g and are shown in Table 1.

Afterwards the polymeric film preparation is carried out as described in Example 1.

The ionic conductivities of the polymeric film are measured at 20° $C_{\cdot(o20° C.)}$ and at 40° $C_{\cdot(o40° C.)}$ and are shown in Table 1.

Example 9

The polymerization is carried out as in Example 8 except that for the following changes:
a) The reactor is heated up to 125° C. and then pressurized to the pressure of relative 49 bar by a monomeric mixture having the following composition by moles:
   VDF: 97.5%
   PVE: 2.5%
b) After the feeding of 55 g of diterbutylperoxide the polymerization reaction starts, the reaction pressure is kept constant by continuously feeding the monomers in the same molar ratios of the initially fed mixture (VDF=97.5%; PVE=2.5%).
c) When 28 g of monomer have reacted, 40.3 g of HCFC 123 are fed as chain transfer agent.
d) When a prefixed amount of monomer corresponding to 4,800 g has reacted in a time of 338 minutes, the feeding of monomers is stopped.

On the final powder the same characterizations of Example 1 are carried out. The MFI value (230° C., 10 Kg load) is equal to 6.9.

The copolymer composition determined by $^{19}$F-NMR is equal to 1.8% by moles of PVE, wherein the complement to 100 is given by VDF.

The copolymer temperature and the second melting enthalpy ($T_{2°}$ and $\Delta H_{2°}$) measured by DSC are respectively 155° C. and 11.3 cal/g and are shown in Table 1.

The polymeric film preparation is carried out as described in Example 1. The ionic conductivities of the polymeric film measured at 20° $C._{(\sigma 20° C.)}$ and at 40° $C._{(\sigma 40° C.)}$ and are shown in Table 1.

TABLE 1

| Example | Comonomer type | Comonomer % by moles | $T_{2°}$ (° C.) | $\Delta H_{2°}$ cal/g | $\sigma 20°$ C. mS/cm | $\sigma 40°$ C. mS/cm |
|---|---|---|---|---|---|---|
| 1 | MVE | 4.8 | 134 | 8.2 | 2.19 | 3.19 |
| 2 | MVE | 3.7 | 140 | 9.1 | 1.99 | 3.0 |
| 3 | MVE | 1.9 | 153 | 10.7 | 1.66 | 2.82 |
| 4 | HFP | 4.9 | 139 | 8.5 | 1.51 | 2.16 |
| 5 | HFP | 2.0 | 153 | 11.0 | 0.89 | 2.16 |
| 6 | EVE | 2.9 | 149 | 9.0 | 2.67 | 3.50 |
| 7 | EVE | 1.8 | 155 | 10.6 | 1.78 | 3.38 |
| 8 | PVE | 3.7 | 142 | 8.4 | 2.91 | 3.89 |
| 9 | PVE | 1.8 | 155 | 11.3 | 1.94 | 3.40 |

TABLE 2

| Example | Comonomer type | Comonomer % by moles | σ 20° C. (before thermal cycle) | σ 20° C. (after thermal cycle) |
|---|---|---|---|---|
| 1 | MVE | 4.8 | 2.19 | 2.16 |
| 2 | MVE | 3.7 | 1.99 | 1.9 |
| 3 | MVE | 1.9 | 1.66 | 0.98 |
| 4 | HFP | 4.9 | 1.51 | 0.8 |

From the data of Table 1, it can be seen that the polymeric films obtained from VDF copolymers of the present invention have high ionic conductivities at 20° C. and/or 40° C., generally higher than about $10^{-3}$ S/cm.

Besides, from the data of Table 2, it is evident that by using perfluoroalkylvinylethers as comonomer in an amount comprised between 2–5% by moles, it is possible to obtain polymeric films maintaining a ionic conductivity higher than about $10^{-3}$ mS/cm, even after thermal treatment cycles up to 80° C.

What is claimed is:

1. A vinylidenfluoride (VDF) copolymer for preparing electrolyte polymers, wherein VDF is copolymerized with perfluoroalkylvinylethers of formula (II):

$$CXY=CZOR_f \qquad (II)$$

wherein:

$R_f$ is a perfluoroalkyl group having from 1 to 3 carbon atoms;

X, Y and Z equal to or different from each other are selected from F, Cl or H;

wherein the amount of perfluoroalkylvinylether monomers (II) is in the range 2–5% by moles;

wherein the copolymer has a melt flow index (MFI), measured at 230° C. according to the ASTM D-1238 method under a 10 kg load, in the range 0.1–100;

said VDF copolymers obtained by emulsion polymerization at 75–120° C., in the presence of organic initiators; said electrolyte polymers having an ionic conductivity higher than about $10^{-3}$ S/cm, wherein the conductivity is maintained after thermal aging cycles at temperatures up to 80° C.

2. The vinylidenfluoride (VDF) copolymer according to claim 1, wherein X, Y and Z are F.

3. The vinylidenfluoride (VDF) copolymer according to claim 1, wherein the electrolyte polymer comprises a solvent containing a dissolved lithium salt, and optionally a plasticizer.

4. The vinylidenfluoride (VDF) copolymer according to claim 3, wherein the solvent amount is in the range 20%–80% by weight of the electrolyte polymer.

5. The vinylidenfluoride (VDF) copolymer according to claim 3, wherein the lithium salts are selected from $LiSO_3CF_3$, $LiN(SO_2CF_3)_2$, $LiPF_5$, $LiClO_4$, $LiAsF_6$, $LiBF_4$.

6. The vinylidenfluoride (VDF) copolymer according to claim 3, wherein the solvents and plasticizers are selected from ethylencarbonate, propylencarbonate, dimethylcarbonate, diethoxyethane, diethylcarbonate, dimethoxyethane, dimethylphthalate, dibutylphthalate, tetraethylene glycol dimethylether, N-methyl-pyrrolidone.

7. The vinylidenfluoride (VDF) copolymer according to claim 1 for obtaining films, separatory elements, anode and cathode of lithium rechargeable batteries.

* * * * *